(12) United States Patent
Stokes et al.

(10) Patent No.: US 10,469,366 B2
(45) Date of Patent: Nov. 5, 2019

(54) REDUNDANT ETHERNET AUTOMATIC PROTECTION SWITCHING ACCESS TO VIRTUAL PRIVATE LAN SERVICES

(71) Applicant: Extreme Networks, Inc., San Jose, CA (US)

(72) Inventors: Olen L. Stokes, Cary, NC (US); Sunil P. Shah, San Jose, CA (US); Arnel Lim, San Jose, CA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 15/190,922

(22) Filed: Jun. 23, 2016

(65) Prior Publication Data
US 2016/0308756 A1    Oct. 20, 2016

Related U.S. Application Data

(63) Continuation of application No. 14/322,643, filed on Jul. 2, 2014, now Pat. No. 9,407,455, which is a
(Continued)

(51) Int. Cl.
*H04L 12/703*  (2013.01)
*H04L 12/42*   (2006.01)
(Continued)

(52) U.S. Cl.
CPC .............. *H04L 45/28* (2013.01); *H04L 12/42* (2013.01); *H04L 12/437* (2013.01);
(Continued)

(58) Field of Classification Search
CPC ... H04L 12/42; H04L 12/437; H04L 12/4641; H04L 45/00; H04L 45/22; H04L 45/28;
(Continued)

(56) References Cited

U.S. PATENT DOCUMENTS 6,766,482 B1   7/2004  Yip et al.
7,003,705 B1   2/2006  Yip et al.
(Continued)

FOREIGN PATENT DOCUMENTS

CN   100558111 C   11/2009
EP   1575221 A1    9/2005
(Continued)

OTHER PUBLICATIONS

International Preliminary Report on Patentability for PCT Patent Application No. PCT/US2009/036548, dated Oct. 12, 2010; 7 Pages.
(Continued)

*Primary Examiner* — Feben Haile
(74) *Attorney, Agent, or Firm* — Sterne, Kessler, Goldstein & Fox P.L.L.C.

(57) ABSTRACT

Embodiments disclosed herein provide redundant connectivity between an Ethernet Automatic Protection Switching (EAPS) access network and a Virtual Private LAN Service (VPLS) network. A first VPLS node is provided to function as an EAPS controller node. A second VPLS node is provided to function as an EAPS partner node. The first and second VPLS nodes are linked by a pseudowire and an EAPS shared-link. Additional EAPS nodes are also provided. The additional EAPS nodes are linked to each other and one of the additional EAPS nodes is designated as a master node. Links are also established between the VPLS nodes and the EAPS nodes such that one or more EAPS rings are formed. Each EAPS ring includes the shared-link between the first and second VPLS nodes. The EAPS rings are monitored to detect link failures. When a failure of the pseudowire shared-link between the first and second VPLS nodes is detected, all pseudowire links associated with the first VPLS node are disabled if any of the EAPS nodes has
(Continued)

a path to both of the VPLS nodes. Otherwise, the existing pseudowire links associated with the first VPLS node are maintained.

22 Claims, 8 Drawing Sheets

Related U.S. Application Data continuation of application No. 13/165,534, filed on Jun. 21, 2011, now Pat. No. 8,797,849, which is a continuation of application No. 12/101,603, filed on Apr. 11, 2008, now Pat. No. 7,990,850.

(51) Int. Cl.
| | |
|---|---|
| H04L 12/46 | (2006.01) |
| H04L 12/24 | (2006.01) |
| H04L 12/26 | (2006.01) |
| H04L 12/701 | (2013.01) |
| H04L 12/707 | (2013.01) |
| H04L 12/437 | (2006.01) |

(52) U.S. Cl.
 CPC .......... *H04L 12/4641* (2013.01); *H04L 41/06* (2013.01); *H04L 41/0659* (2013.01); *H04L 43/0817* (2013.01); *H04L 45/00* (2013.01); *H04L 45/22* (2013.01)

(58) Field of Classification Search
 CPC .. H04L 41/06; H04L 41/0659; H04L 43/0817
 See application file for complete search history.

(56) References Cited

U.S. PATENT DOCUMENTS

| | | | | |
|---|---|---|---|---|
| 7,106,729 | B1* | 9/2006 | Gullicksen | H04L 49/1515 370/217 |
| 7,269,135 | B2 | 9/2007 | Frick et al. | |
| 7,626,930 | B2* | 12/2009 | Agmon | H04L 12/4641 370/230 |
| 7,990,850 | B2 | 8/2011 | Stokes et al. | |
| 8,174,963 | B2 | 5/2012 | Tochio | |
| 8,264,952 | B2 | 9/2012 | Umansky et al. | |
| 8,320,389 | B2 | 11/2012 | Zhang et al. | |
| 8,797,849 | B2 | 8/2014 | Stokes et al. | |
| 9,407,455 | B2 | 8/2016 | Stokes et al. | |
| 2004/0081083 | A1* | 4/2004 | Sekihata | H04L 12/42 370/222 |
| 2009/0010257 | A1* | 1/2009 | Chaudhry | H04L 45/02 370/390 |
| 2009/0245261 | A1* | 10/2009 | Khan | H04L 12/4641 370/395.53 |
| 2009/0257348 | A1 | 10/2009 | Stokes et al. | |
| 2009/0274155 | A1* | 11/2009 | Nakash | H04L 12/462 370/395.53 |
| 2011/0249552 | A1 | 10/2011 | Stokes et al. | |
| 2011/0286462 | A1* | 11/2011 | Kompella | H04L 45/18 370/395.53 |
| 2014/0347980 | A1 | 11/2014 | Stokes et al. | |

FOREIGN PATENT DOCUMENTS

| | | |
|---|---|---|
| JP | 2005-260927 A | 9/2005 |
| JP | 2006-279279 A | 10/2006 |
| WO | WO 2007/083311 A2 | 7/2007 |
| WO | WO 2007/144870 A2 | 10/2007 |
| WO | WO 2008/080427 A1 | 7/2008 |

OTHER PUBLICATIONS

International Search Report & Written Opinion for PCT/US2009/036548, dated Jun. 19, 2009; 12 pages.
"Ethernet Automatic Protection Switching (EAPS)", Extreme Networks, Inc., XP007905581, (Nov. 30, 2006); 5 pages.
"ExtremeWare Operating System, Version 7.7", Extreme Networks Data Sheet, retrieved from www.extremenetworks/com/libraries/products/DSExWare_1044.pdf, on May 11, 2009.
"RFC 3619—Extreme Networks' Ethernet Automatic Protection Switching, version 1", retrieved from http://www.faqs.org/rfcs/rfc3619/html, XP002449412, (Oct. 2003 ); 4 pages.
Sajasi, Ali, et al., "VPLS Interoperability with CE Bridges", IETF Standard—working draft, Internet Engineering Taskforce, IETF, XP015043022, (Oct. 1, 2004); 19 pages.
Lasserre, M. et al.: "Virtual Private LAN Service (VPLS} Using Label Distribution Protocol (LOP) Signaling", Network Working Group; Request for Comments 4762; Category: Standards Track; Alcatel-Lucent; Jan. 2007; 29 pages.
Muley et al.: "Preferential Forwarding Status Bit Definition", Network Working Group, Internet Draft, Feb. 25, 2008 (expires Aug. 25, 2008); draft-ietf-pwe3-redundancy-bit-00.txt; 26 pages.
Muley et al.: "Pseudowire (PW) Redundancy", Network Working Group, Internet Draft, Intended Status: Informational; Mar. 28, 2008 (expires Aug. 28, 2008); draft-ietf-pwe3-redundancy-00.txt; 13 pages.
Sajassi et al.: "VPLS Interoperability With CE Bridges", Internet Working Group, Internet Draft, Intended Status: Informational; Nov. 2007 (expires May 2008); draft-ietf-12vpn-vpls=bridge-interop-02.txt; 18 pages.
English Translation of Notice of the Reasons for Refusal issued for Japanese Patent Application No. 2011-504028, dated Jul. 30, 2013; 2 pages.
Notice of Registration and Notice of Grant of a Patent Right for an Invention for Chinese Patent Application No. 200980112834.9, dated Oct. 9, 2013; 7 pages.
Communication pursuant to Article 94(3) EPC for European Patent Application No. 12 173 669.8-1505, dated Feb. 24, 2014; 6 pages.
Communication Under Rule 71 (3) EPC for European Patent Application No. 09730176.6, dated Feb. 24, 2014; 7 pages.
Notice of Allowance for Japanese Patent Application No. 2011-504028, dated Apr. 22, 2014; 3 pages.
RFC 3985, "Pseudo Wire Emulation Edge-to-Edge (PWE3) Architecture," Bryant et al., Eds., Mar. 2005, Online at: http://www.openrfc.org/rfc/3985.pdf; 42 pages.
Non-Final Office Action for Chinese Patent Application No. 200980112834.9, dated Jan. 30, 2013.
Non-Final Office Action for Japanese Patent Application No. 2011-504028, dated Feb. 26, 2013; 10 pages.
Extended European Search Report for European Patent Application No. 12173669.8, dated Sep. 7, 2012.
European Office Action for European Patent Application No. 09730176.6, dated Jan. 13, 2012.
Non-Final Office Action for U.S. Appl. No. 12/101,603, dated Feb. 1, 2010; 16 Pages.
Communication Pursuant to Rules 161 (1) and 162 EPC for European Patent Application No. 09730176.6, dated Nov. 25, 2010; 11 Pages.
Notice of Allowance for U.S. Appl. No. 12/101,603, dated Apr. 6, 2011; 11 pages.
Extreme Networks', "Ethernet Automatic Protection Switching (EAPS)", Extreme Networks', Inc., Nov. 30, 2006, XP007905581; 5 Pages.
"ExtremeWare Operating System, Version 7.7", Extreme Networks Data Sheet, [Online] 2006, XP002527386, Retrieved from the Internet: URL: http://www.extremenetworks.com/libraries/products/DSExWare_1044.pdf>; 5 Pages.
"RFC 3619—Extreme Networks' Ethernet Automatic Protection Switching (EAPS) Version 1", IEFT, [Online] Oct. 2003, XP002449412, Retrieved from the Internet: URL: http://www.faqs.org/rfcs/rfc3619.html>; 4 Pages.
Sajassi, Ali et al., "VPLS Interoperability with CE Bridges draft-sajassi-12vpn-vplsbridge-interop-02.txt", IETF Standard-Working_Draft, Internet Engineering Task Force, IETF, CH, No. 2, Oct. 1, 2004, XP015043022; 19 Pages.
Non-Final Office Action for U.S. Appl. No. 13/165,534, dated Oct. 4, 2012; 33 pages.
Final Office Action for U.S. Appl. No. 13/165,534, dated May 31, 2013; 33 pages.

(56) References Cited

OTHER PUBLICATIONS

Notice of Allowance for U.S. Appl. No. 13/165,534, dated Mar. 28, 2014; 14 pages.
Supplemental Notice of Allowability for U.S. Appl. No. 13/165,534, dated May 27, 2014; 11 pages.
"RFC 3619—Extreme Networks' Ethernet Automatic Protection Switching (EAPS) Version 1", IEFT, [Online] Oct. 2003, XP002449412, Retrieved from the Internet: URL: http://www.faqs.org/rfcs/rfc3619.html; 6 pages.
Search Report by Registered Searching Organization, drafted Jan. 31, 2013 in Japanese Patent Application No. 2011-504028, with attached English Translation; 19 pages.

* cited by examiner

REDUNDANT ETHERNET AUTOMATIC PROTECTION SWITCHING ACCESS TO VIRTUAL PRIVATE LAN SERVICES

CLAIM OF PRIORITY

This application is a continuation application of, and claims priority to, U.S. patent application Ser. No. 14/322,643, filed on Jul. 2, 2014, (now allowed), which is a continuation of non-provisional U.S. patent application Ser. No. 13/165,534, filed on Jun. 21, 2011, which is a continuation application of, and claims priority to, non-provisional U.S. patent application Ser. No. 12/101,603, filed on Apr. 11, 2008. The aforementioned, earlier-filed applications are hereby incorporated herein by reference in their entireties.

FIELD

Embodiments of the invention relate to computer networking, and more particularly to redundantly connecting a VPLS network with an EAPS network.

BACKGROUND

Computer networks are becoming increasingly important for businesses and communities. Cost efficiency, network capacity, scalability and flexibility are all important considerations in building and maintaining various networks. With a wide variety of services, protocols and technologies, it can be difficult to integrate and/or provide connectivity between different types of networks.

Virtual Private LAN Service (VPLS) is a way to provide Ethernet based multipoint to multipoint communication over IP/MPLS networks. VPLS allows geographically dispersed sites to share an Ethernet broadcast domain by connecting sites through pseudowires (PWs).

Ethernet Automatic Protection Switching (EAPS), offered by Extreme Networks of Santa Clara, Calif., is a solution for fault-tolerant networks. EAPS provides for a loop-free operation and a sub-second ring recovery. EAPS version 2 (EAPSv2) is configured and enabled to avoid the potential of super loops in environments where multiple EAPS domains share a common link. EAPSv2 functions use the concept of a "controller" and a "partner" mechanism. Shared port status is verified using health protocol data units (PDUs) exchanged by controller and partner. When a shared-link goes down, the configured controller will open only one segment port for each of the protected VLANs, keeping all other segment ports in a blocking state.

The Internet Engineering Task Force (IETF) RFC 4762, entitled "Virtual Private LAN Service (VPLS) Using Label Distribution Protocol (LDP) Signaling" proposes the use of redundant pseudowires (PWs) to attach to a VPLS core network. However, this technique is applicable only where a single attachment node is necessary. The IETF draft entitled "VPLS Interoperability with CE Bridges" also discusses redundant access to VPLS core networks. However, this technique does not address ring-based access networks and it utilizes only a single active attachment to a VPLS network. Likewise, the IETF draft entitled "Pseudowire (PW) Redundancy" discusses redundant access to VPLS core networks, but fails to address ring-based access networks and only utilizes a single active attachment to a VPLS core network.

SUMMARY OF THE INVENTION

Embodiments disclosed herein provide redundant connectivity between an Ethernet Automatic Protection Switching (EAPS) access network and a Virtual Private LAN Service (VPLS) network. A first VPLS node is provided to function as an EAPS controller node. A second VPLS node is provided to function as an EAPS partner node. The first and second VPLS nodes are linked by a pseudowire. This pseudowire is normally transmitted across an EAPS shared-link. Additional EAPS nodes are also provided. The additional EAPS nodes are linked to each other and one of the additional EAPS nodes is designated as a master node. Links are also established between the VPLS nodes and the EAPS nodes such that one or more EAPS rings are formed. Each EAPS ring includes the shared-link between the first and second VPLS nodes. The EAPS rings are monitored to detect link failures. When a failure of the shared-link between the first and second VPLS nodes is detected, all pseudowire links associated with the first VPLS node are disabled if any of the EAPS nodes has a path to both of the VPLS nodes. Otherwise, the existing pseudowire links associated with the first VPLS node are maintained.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

As provided herein, methods, apparatuses, and systems enable redundant connectivity between a Virtual Private LAN Service (VPLS) network and an Ethernet Automatic Protection Switching (EAPS) network. More particularly, multiple active attachments to a VPLS network are provided in various embodiments.

Figure 1:
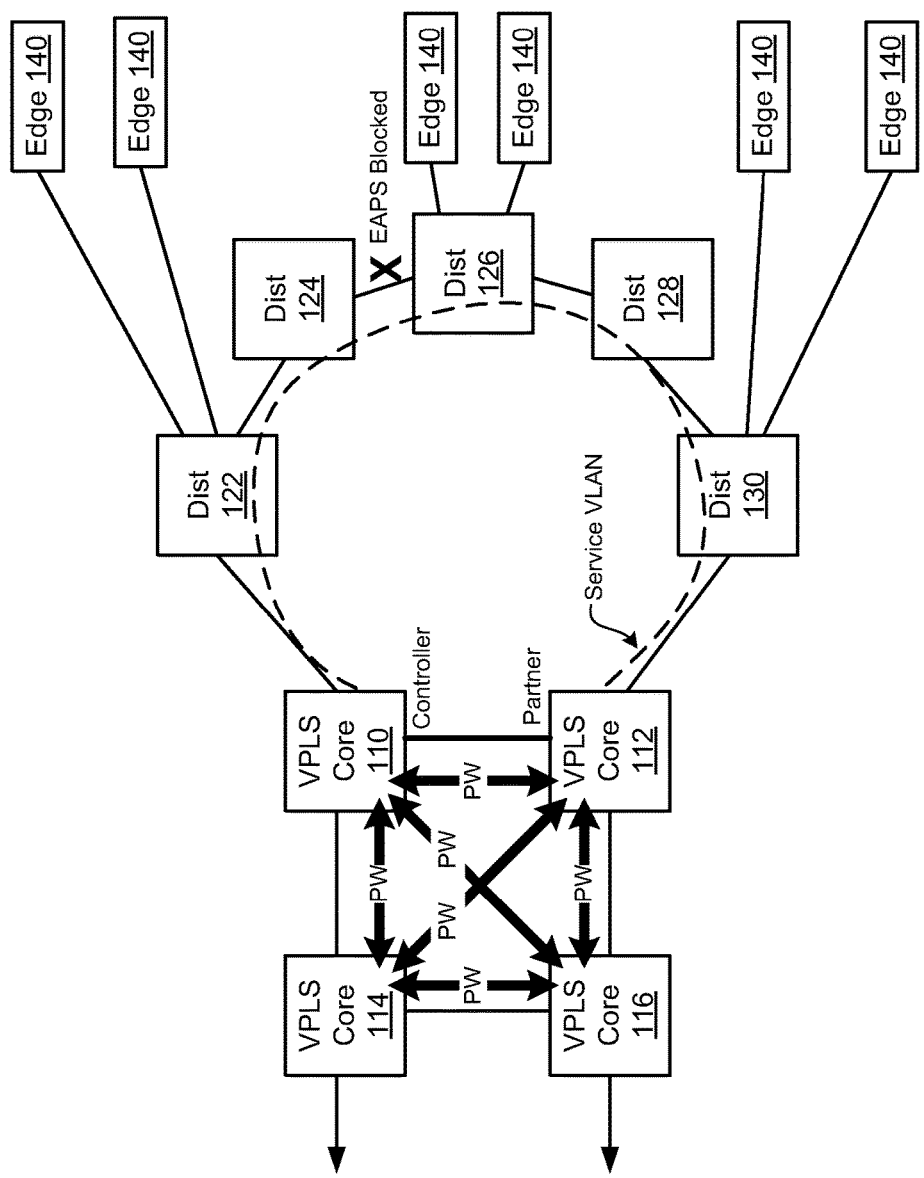
FIG. 1 is a block diagram illustrating a VPLS-EAPS configuration according to various embodiments.

FIG. 1 is a block diagram illustrating a VPLS-EAPS configuration according to various embodiments. As used herein, a VPLS-EAPS configuration involves multiple attachment points between a VPLS network and an EAPS network, the attachments normally active. As shown, VPLS core nodes 110, 112, 114 and 116 are linked via pseudowires. As used herein, a link refers to any line or channel over which data is transmitted. A pseudowire, as used herein, refers to a mechanism for emulating various networking or telecommunications services across packet-switched networks, such as those mechanisms that use Ethernet, Internet Protocol (IP), Label Switched Paths (LSPs), Multi-protocol Label Switching (MPLS) and/or the like. Emulated services can include T1 leased line, frame relay, Ethernet, Asynchronous Transfer Mode (ATM), time-division multiplexing (TDM), or Synchronous Optical Networking (SONET)/Synchronous Digital Hierarchy (SDH). As discussed in RFC 3985 entitled "Pseudo Wire Emulation Edge-to-Edge [PWE3] Architecture," a pseudowire delivers only the functionality necessary to emulate a wire with some required degree of fidelity for some specific service definition.

As shown in FIG. 1, VPLS core nodes 110 and 112 are attached to the EAPS access ring. Rather than having core node 110 or 112 function as the EAPS master node, distribution node 124 is designated as the master node. When a network failure is detected on the ring, the master node in an EAPS system receives control messages over the control VLAN, the control messages indicating the network failure. During normal operation, the master node blocks the protected data VLAN traffic from traversing its secondary port. During a network failure, the master node unblocks its secondary port and routes the protected data VLAN traffic through its secondary port. The secondary port is re-blocked once the failure has been fixed. In various embodiments, any node in the EAPS ring that is not a VPLS node can be designated as the EAPS master node. In various embodiments, the VPLS core nodes attached to the EAPS ring function as EAPS controller and partner nodes, respectively. In FIG. 1, core node 110 functions as the controller node while core node 112 functions as the partner node. The EAPS controller node (e.g., core node 110) includes a controller state machine, which keeps track of whether EAPS nodes on the ring have access to both attached VPLS nodes (e.g., core nodes 110 and 112).

In various embodiments, when a VPLS customer VLAN (or VMAN) is attached to an EAPS ring, as shown in FIG. 1, the EAPS ring segment between core nodes 110 and 112 is removed in favor of a pseudowire connection between core nodes 110 and 112. The term "shared-link," as used herein, refers to a special EAPS link that is typically shared among multiple EAPS rings. While a shared-link is often shared among multiple EAPS rings, a shared-link can also be maintained for a single EAPS ring. In addition to facilitating port management among multiple EAPS rings, functions and/or mechanisms associated with the shared-link (e.g., controller node state machine, etc.) may be used to assist in managing communication between EAPS and VPLS. The EAPS master node (e.g., node 124) does not necessarily have or receive any information regarding the connection change between core nodes 110 and 112. However, the EAPS functionality on core nodes 110 and 112 do have information regarding the connection change given that the connection change requires configuring an EAPS-protected VLAN with only one port on the ring. It should be noted that this configuration does not change the EAPS control VLAN—the EAPS ring is still complete and the EAPS master node (e.g., node 124) still blocks a port on the customer access VLAN when the ring is intact.

Figure 2:
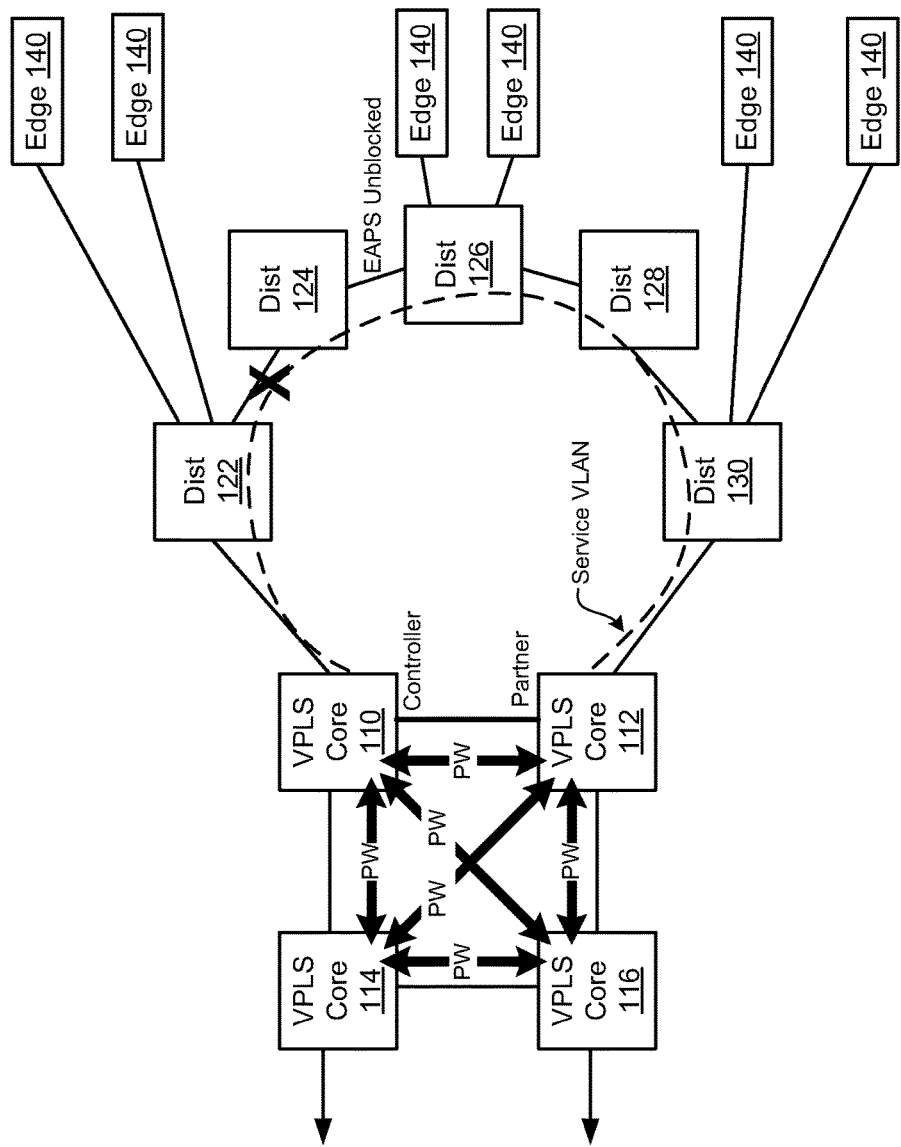
FIG. 2 is a block diagram illustrating a VPLS-EAPS configuration according to various embodiments.

FIG. 2 shows an example of a link failure, in this case between nodes 122 and 124. From a connectivity perspective, various embodiments of the VPLS-EAPS configuration appropriately handle access ring failures like the link failure shown in FIG. 2. When the EAPS master node (e.g., node 124) detects a topology change (e.g., due to a link failure notification from a node on the ring, a hello timeout, etc.), the master node unblocks its secondary port on the protected VLAN. The only difference in FIG. 2 (as compared to FIG. 1) is that the link failure and subsequent unblocking of the master node's secondary port causes node 124 to now connect to the VPLS network via core node 112 instead of via core node 110. Thus, connectivity is recovered.

Figure 3:
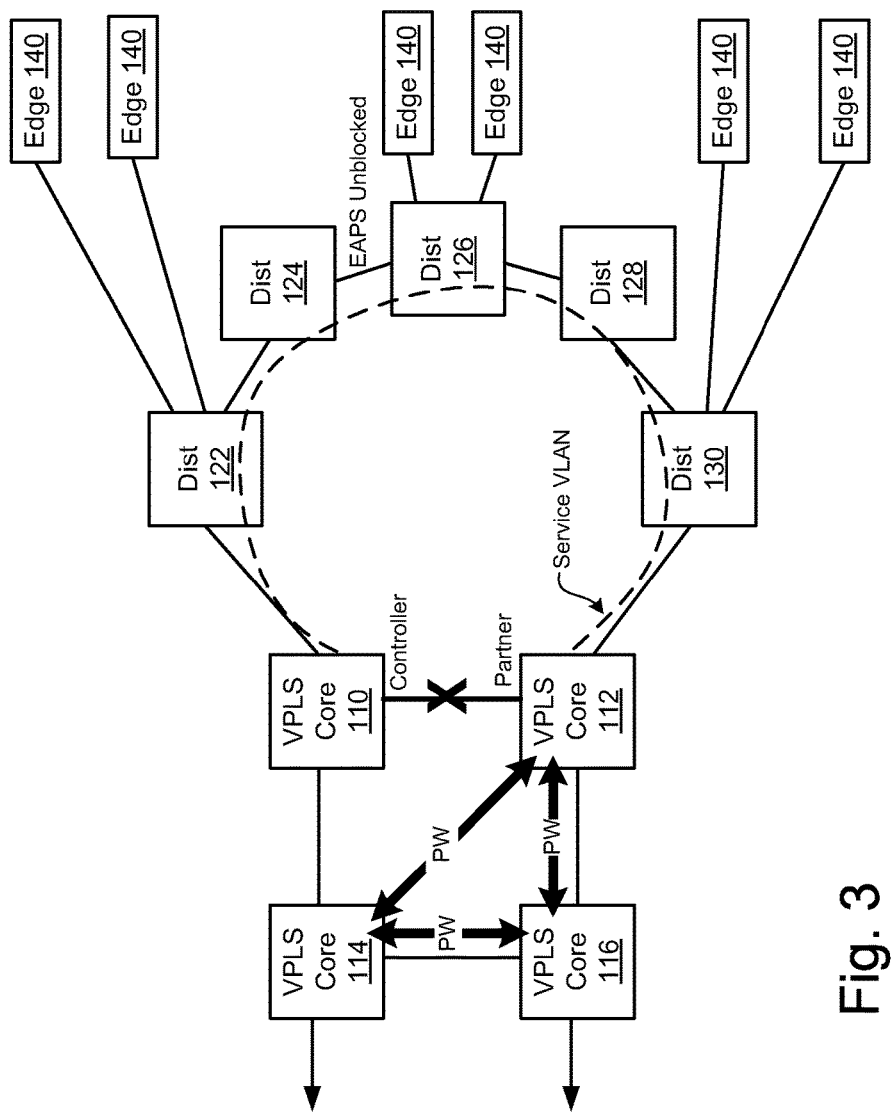
FIG. 3 is a block diagram illustrating a VPLS-EAPS configuration according to various embodiments.

The connectivity recovery scenario changes when the shared-link between core nodes 110 and 112 fails. As illustrated in FIG. 3, when the shared-link fails, the EAPS master node (e.g., node 124) again unblocks its secondary port (as it does whenever there is a failure on the access ring). However, when this occurs, both VPLS core nodes (i.e., nodes 110 and 112) might receive a copy of any traffic that is not destined for a node on the EAPS access ring. For example, if the shared-link between core nodes 110 and 112 failed and distribution node 126 was trying to send a packet to VPLS core node 116, core nodes 110 and 112 might each receive a copy of the packet. This would result in duplicate packets being sent into the VPLS network. Additionally, given that the pseudowire between core nodes 110 and 112 could be reestablished using a different path (e.g., via the path from node 112 to node 116 to node 114 to node 110), this scenario could result in a traffic loop on the EAPS access ring as well as a storm into the VPLS network. To prevent this scenario from occurring, VPLS core node 110 (functioning as the EAPS controller node) takes the action of removing and/or disabling all pseudowires associated with core node 110 when the shared-link between core nodes 110 and 112 fails. The removal of pseudowires can be seen in FIG. 3. Once the pseudowires have been removed and/or disabled, all traffic traveling between the EAPS access network and the VPLS network passes through VPLS core node 112. When core node 110 (i.e., the controller node) detects that the shared-link between nodes 110 and 112 is repaired, the pseudowires are reestablished.

When core node 110 removes its pseudowires, core node 110 also signals its VPLS peers (e.g., VPLS core nodes 114, 116, and 112) to inform them that the pseudowires are no longer active. In some embodiments, this signaling is accomplished by completely withdrawing the pseudowires. In other embodiments, the signaling is accomplished by indicating a "standby" state for the pseudowires.

Figure 4:
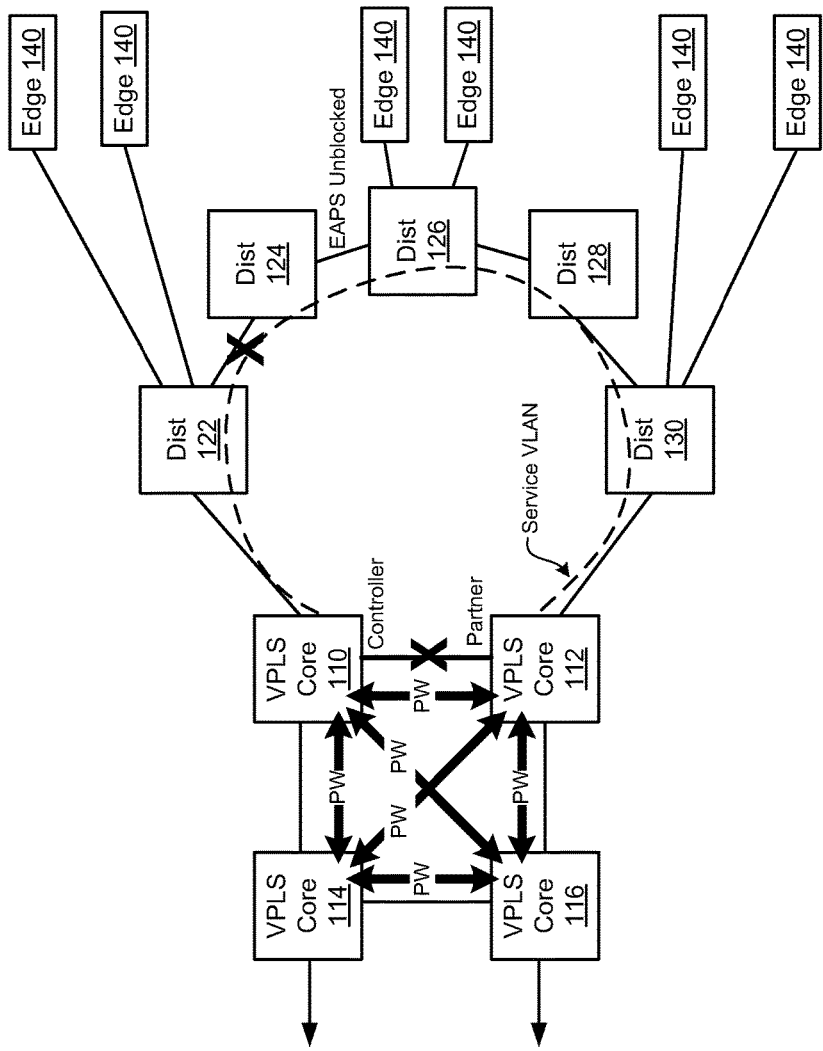
FIG. 4 is a block diagram illustrating a VPLS-EAPS configuration according to various embodiments.

FIG. 4 shows a link failure on both the shared-link (i.e., the link between nodes 110 and 112) and on the access ring (e.g., between nodes 122 and 124). In a dual failure scenario such as this, VPLS core nodes 110 and 112 do not both receive a copy of ring traffic, unlike the scenario where only the shared-link fails. For example, in FIG. 4, the only path to the VPLS network for distribution node 122 is through core node 110 in this dual failure scenario. Similarly, the only path to the VPLS network for distribution node 128 is through core node 112. Accordingly, in a dual failure scenario where one of the failed links is the VPLS core shared-link, core node 110 maintains its pseudowires rather than removing and/or disabling the pseudowires.

Figure 5:
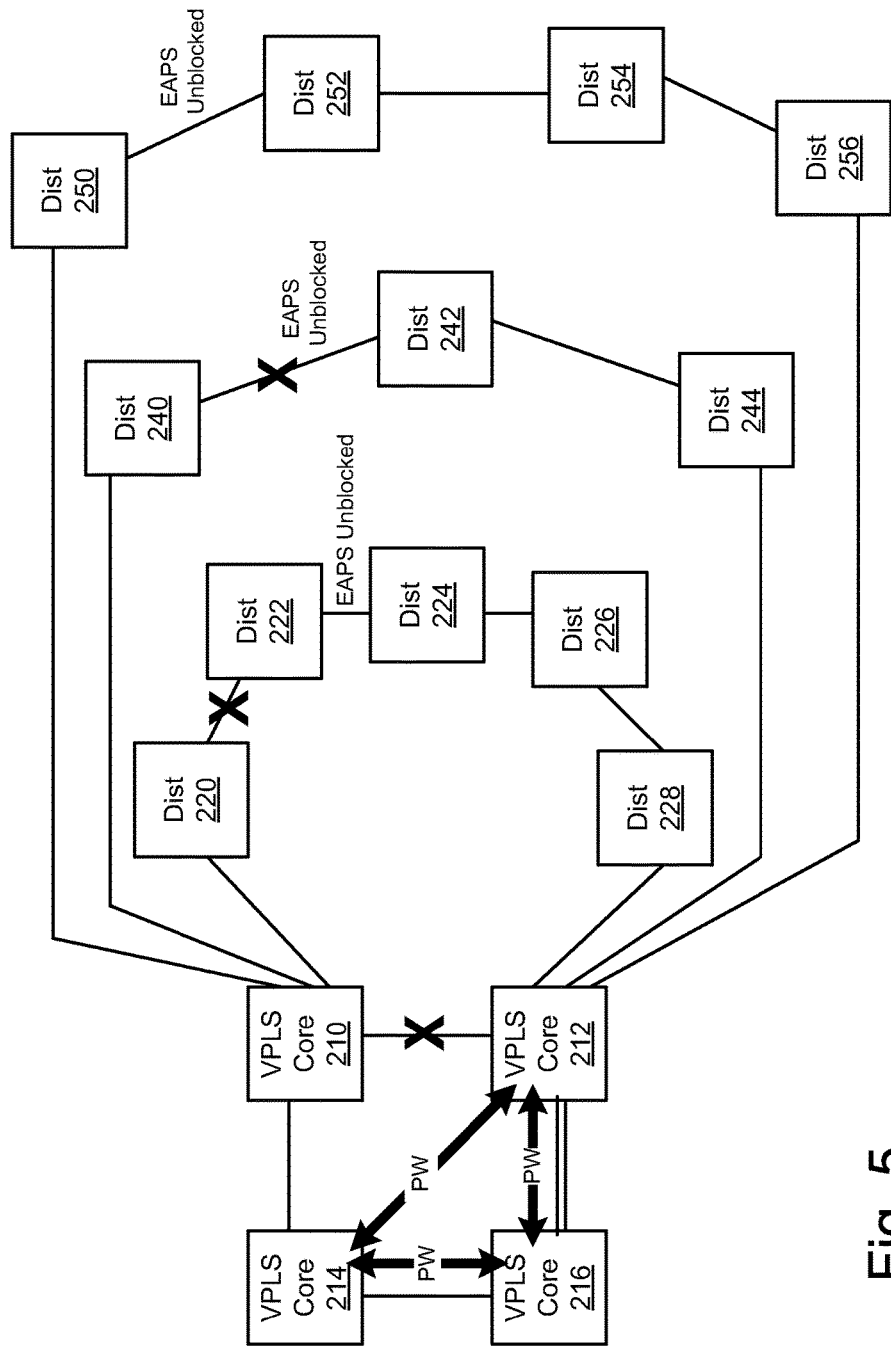
FIG. 5 is a block diagram illustrating a VPLS-EAPS configuration according to various embodiments.

FIG. 5 illustrates multiple parallel EAPS access rings attached to a VPLS core network. As shown, each of the EAPS rings is attached to both core node 210 and core node 212. Each of the EAPS rings shares the link (i.e., the shared-link) between node 210 and node 212. Functions and/or mechanisms associated with the shared-link manage and/or maintain EAPS topology information that can be propagated to the VPLS network. Here, as long as any of the parallel EAPS rings is complete, there exists a path to both core VPLS nodes—in this case, nodes 210 and 212. When the shared-link between nodes 210 and 212 is in a failed state (as shown), the EAPS master node on each ring unblocks its secondary port. For the two inner EAPS rings, illustrated in FIG. 5, this causes no problems because each of these rings has an additional link failure on the ring which prevents nodes in these rings from having a path to both VPLS core nodes (i.e., nodes 210 and 212). However, the outer ring has no other link failures. Thus, distribution nodes (e.g., 250, 252, 254 and 256) on this outer ring do have a path to both VPLS nodes 210 and 212. It should be noted that both VPLS nodes still perform L2 switching on all of the access rings. Therefore, all of the nodes on all three rings have a path to both VPLS nodes. As discussed above, a path from an EAPS ring to both core nodes on the VPLS network can cause an access ring loop and/or a VPLS storm. Thus, in embodiments having parallel EAPS rings attached to the VPLS core, the controller node (e.g., core node 210) must disable all pseudowires associated with the controller node if and when any of the parallel EAPS rings are complete or "up" (e.g., no link failures) and the shared-link is failed. If all parallel EAPS rings are in a failed state or "down" (e.g., at least one failed link on each ring), then the controller node (e.g., node 210) maintains all its existing pseudowires regardless of the state of the shared-link. The following table shows the recovery actions to be taken on the controller node in various embodiments:

TABLE 1

| Ring State | Core Link State | |
| --- | --- | --- |
| | Core Link Up | Core Link Down |
| Any Parallel Ring Up | PWs Active | PWs Inactive |
| Any Parallel Ring Down | PWs Active | PWs Active |

In various embodiments, changes in topology on either the access ring(s) or the VPLS network may cause changes to the path(s) used to reach customer devices. For example, in FIG. 2, the path that distribution node 124 would take to reach other parts of the VPLS network changes following the failure on the access ring of the link between nodes 122 and 124. Prior to failure of that link, node 124 reached the VPLS network via core node 110. Following the failure, node 124 accesses the VPLS network via core node 112.

When the EAPS master node (e.g., node 124 in FIG. 1, node 222 in FIG. 5, etc.) detects a topology change, it sends a "flush FDB" message to its other transit nodes (i.e., the other nodes on the ring). In some embodiments, the flush message causes the ring's MAC addresses to be relearned on each node in the ring. Given that the flush message is an EAPS message that is propagated to the other nodes on the ring, the flush message is not inherently propagated over the VPLS network. Also, the attachments at the remote VPLS nodes may not be utilizing EAPS. Using the above example, VPLS node 114 (FIG. 2) would expect to find node 124 via the pseudowire between VPLS node 114 and VPLS node 110. However, upon the occurrence of a link failure between nodes 122 and 124, any traffic sent from VPLS node 114 to node 124 via VPLS node 110 will not reach its destination given that VPLS node 114 is not aware of the topology change and is configured to send traffic on a path through the failed link. To overcome this problem, EAPS informs VPLS about any received EAPS "flush FDB" messages on both the controller and partner nodes (e.g., nodes 110 and 112). The controller and partner nodes can then propagate this information so that other VPLS nodes can flush their respective forwarding databases (e.g., MAC addresses, etc.). Given that MAC addresses, for example, are learned from a particular originating node (e.g., VPLS node 116 learns the MAC address for node 128 from VPLS node 112), both the controller and the partner node inform the other VPLS nodes of any topology changes.

Figure 6:
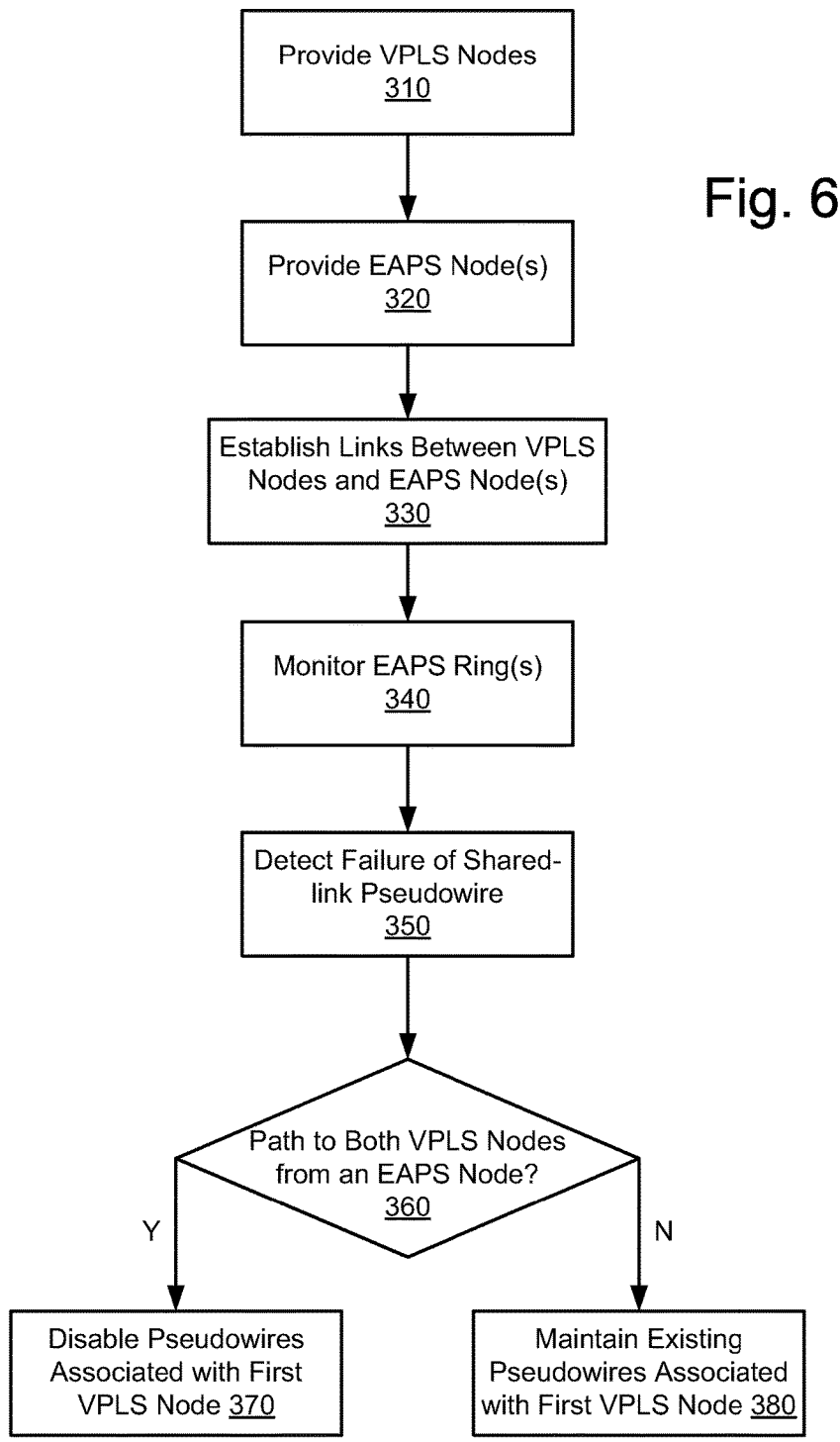
FIG. 6 is a flow diagram illustrating a process for redundant connectivity between a VPLS network and an EAPS network according to various embodiments.

FIG. 6 is a flow diagram illustrating a process for redundant connectivity between a VPLS network and an EAPS network. Two VPLS nodes are provided 310 to function as an EAPS controller node and partner node, respectively. The two VPLS nodes are linked by a pseudowire across an EAPS shared-link. Additional EAPS nodes are also provided 320. The additional EAPS nodes are linked to each other and one of the additional EAPS nodes is designated as a master node. Links are also established between the VPLS nodes and the EAPS nodes such that one or more EAPS rings are formed 330. Each EAPS ring includes the shared-link between the first and second VPLS nodes. The EAPS rings are monitored 340 to detect link failures. When a failure of the pseudowire shared-link between the first and second VPLS nodes is detected 350, it is determined 360 whether any of the EAPS nodes has a path to both of the VPLS nodes. If yes, then all pseudowires associated with the controller node are disabled 370. If no, then the existing pseudowire links associated with the first VPLS node are maintained 380.

Figure 7:
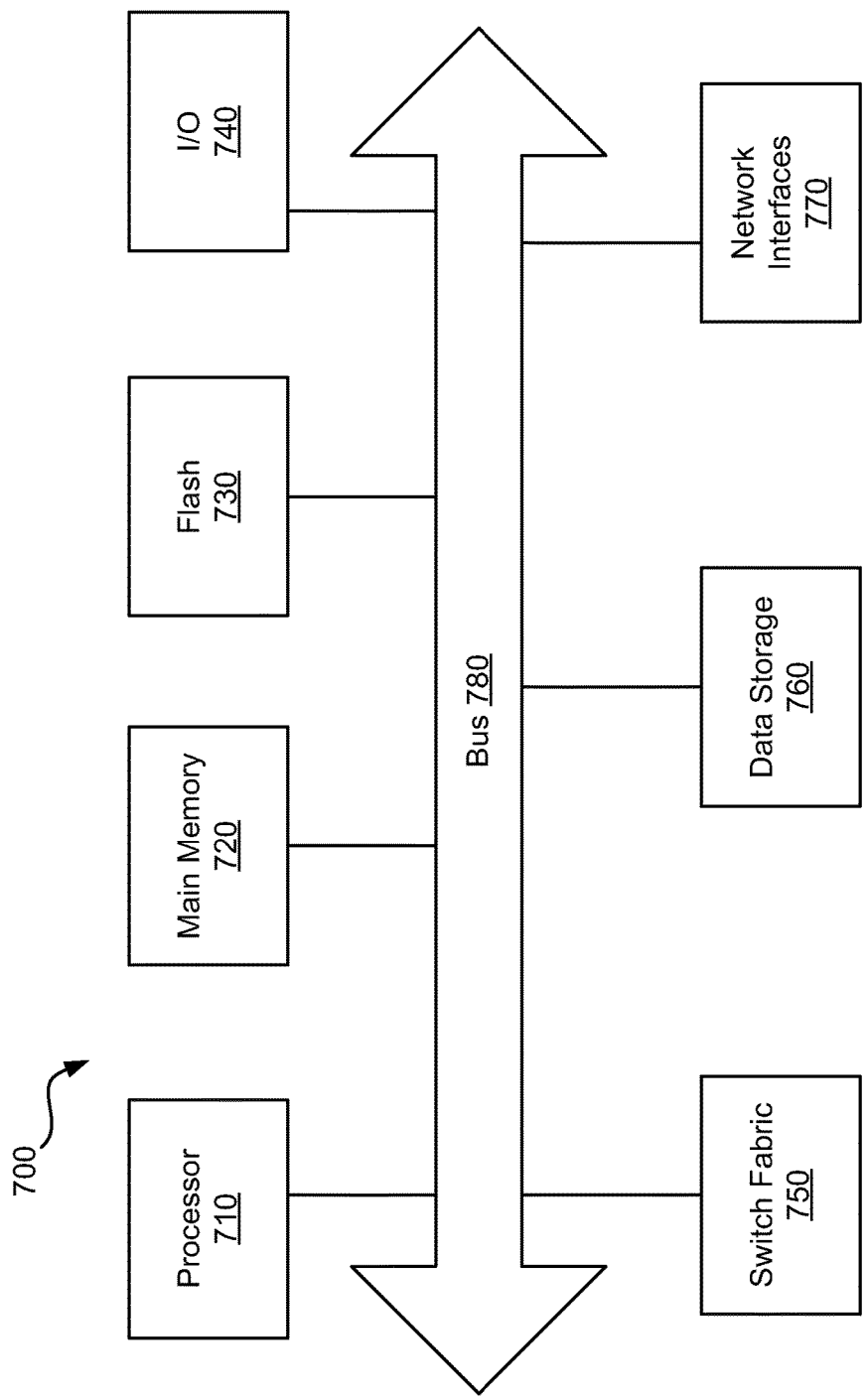
FIG. 7 is a block diagram illustrating a suitable computing environment for practicing various embodiments described herein.

FIG. 7 is a block diagram illustrating a suitable computing environment for practicing various embodiments described herein. Collectively, these components are intended to represent a broad category of hardware systems, including but not limited to general purpose computer systems and specialized network switches.

Computer system 700 includes processor 710, I/O devices 740, main memory 720 and flash memory 730 coupled to each other via a bus 780. Main memory 720, which can include one or more of system memory (RAM), and non-volatile storage devices (e.g., magnetic or optical disks), stores instructions and data for use by processor 710. Additionally, the network interfaces 770, data storage 760, and switch fabric 750 are coupled to each other via a bus 780. Data storage 760 represents the routing database (e.g., forwarding database tables, etc.) described herein as well as other storage areas such as packet buffers, etc., used by the switch fabric 750 for forwarding network packets or messages.

The various components of computer system 700 may be rearranged in various embodiments, and some embodiments may not require nor include all of the above components. Furthermore, additional components may be included in system 700, such as additional processors (e.g., a digital signal processor), storage devices, memories, network/communication interfaces, etc.

In the illustrated embodiment of FIG. 7, methods and apparatuses for providing redundant connectivity between an EAPS network and a VPLS network according to the present invention as discussed above may be implemented as a series of software routines run by computer system 700 of FIG. 7. These software routines comprise a plurality or series of instructions to be executed by a processing system in a hardware system, such as processor 710. Initially, the series of instructions are stored on a data storage device 760 (e.g., in a route manager database), memory 720 or flash 730.

Figure 8:
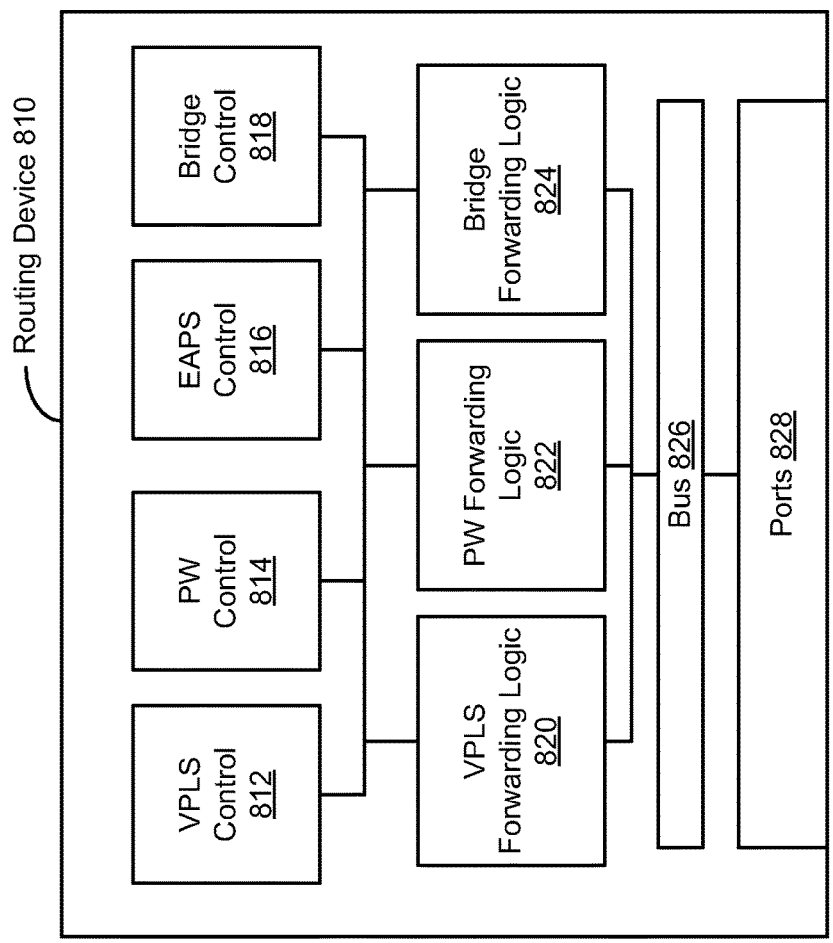
FIG. 8 is a block diagram illustrating a routing device according to various embodiments.

FIG. 8 illustrates the various components of a routing device that may be used in various embodiments. Routing device 810 includes a VPLS control component 812, a pseudowire (PW) control component 814, an EAPS control component 816, and a Bridge control component 818. The VPLS control component 812 facilitates establishing a complete VPLS comprised of multiple PWs. The PW control function 814 establishes the individual PWs and signals PW state information to peers. The EAPS control function 816 monitors and controls EAPS operation. The bridge control function 818 monitors and controls normal L2 bridge operation. The EAPS control function 816 provides the VPLS control 812 and/or PW control 814 functions with information about the state of the EAPS shared-link and the EAPS ring connectivity. The VPLS forwarding logic component 820, the PW forwarding logic component 822, and the bridge forwarding component 824 combine to forward data packets between PWs and VPLS customers. These forwarding components are coupled via bus 826. Based on the logic of these components, traffic is routed on the routing device ports 828. Routing device 810 is an example of a routing device that could be used for VPLS core nodes 110 and/or 112 of FIG. 2, for example.

Various components described herein may be a means for performing the functions described herein. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a computer readable medium, which provides content that represents instructions that can be executed. The content may result in a computer performing various functions/operations described herein. A computer readable medium includes any mechanism that provides (i.e., stores and/or transmits) information in a form accessible by a computing device (e.g., computer, PDA, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or the like. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for providing redundant network connectivity, the method comprising:
    forwarding traffic in a network, wherein the network comprises a plurality of Ethernet Automatic Protection Switching (EAPS) nodes, an EAPS shared-link, a first Virtual Private LAN Service (VPLS) node, and a second VPLS node, wherein the plurality of EAPS nodes are connected to one or more EAPS rings, wherein the EAPS shared-link connects the first VPLS node to the second VPLS node, and wherein both of the first VPLS node and the second VPLS node are connected to a pseudowire link;
    detecting a network failure of the EAPS shared-link;
    in response to detecting the network failure of the EAPS shared-link, determining that at least one of the plurality of EAPS nodes has a path to both of the first VPLS node and the second VPLS node; and
    in response to determining that at least one of the plurality of EAPS nodes has a path to both of the first VPLS node and the second VPLS node, removing the pseudowire link connecting the first VPLS node to the second VPLS node such that traffic in the network passes through only one of the first VPLS node and the second VPLS node.

2. The method of claim 1, wherein the network further comprises a third VPLS node linked to at least one of the first VPLS node and the second VPLS node, wherein the method further comprises:
    communicating an indication of the removed pseudowire link to the third VPLS node.

3. The method of claim 1, further comprising:
    detecting the EAPS shared-link is operational; and
    in response to detecting the EAPS shared-link is operational, reestablishing the removed pseudowire link connecting the first VPLS node to the second VPLS node.

4. The method of claim 1, further comprising:
    determining that the plurality of EAPS nodes lacks a path to one of the first VPLS node and the second VPLS node; and
    in response to detecting the network failure of the EAPS shared-link and determining that the plurality of EAPS nodes lacks the path to one of the first VPLS node and the second VPLS node, maintaining the pseudowire link connecting the first VPLS node to the second VPLS node.

5. The method of claim 1, wherein the EAPS shared-link is a pseudowire link.

6. The method of claim 1, further comprising:
    computing whether each of the plurality of EAPS nodes has access to the first VPLS node and the second VPLS node.

7. The method of claim 1, wherein the first VPLS node and the second VPLS node are connected to each of a plurality of EAPS rings, wherein each of the plurality of EAPS rings utilize the EAPS shared-link.

8. The method of claim 1, further comprising:
    configuring one of the plurality of EAPS nodes to function as an EAPS master node, wherein the EAPS master node is configured to receive a control message indicating the network failure of the EAPS shared-link.

9. The method of claim 8, further comprising:
    blocking a secondary port of the EAPS master node; and
    in response to detecting the network failure of the EAPS shared-link, unblocking the secondary port of the EAPS master node.

10. The method of claim 1, wherein the removed pseudowire link transitions from being operational for traffic with the one or more EAPS rings to being non-operational for the traffic with the one or more EAPS rings.

11. The method of claim 1, further comprising:
    determining if at least one of the plurality of EAPS nodes has a path to both of the first VPLS node and the second VPLS node; and
    in response to detecting the network failure of the EAPS shared-link and determining that the at least one of the plurality of EAPS has the path to both of the first VPLS node and the second VPLS node, configuring the first VPLS node to remove the pseudowire link connecting the first VPLS node to the second VPLS node, wherein the first VPLS node and the second VPLS node are connected to each of a plurality of EAPS rings, wherein each of the plurality of EAPS rings utilize the EAPS shared-link.

12. A first routing device, comprising:

one or more ports to connect the first routing device to a network, wherein the network comprises a second routing device, a plurality of Ethernet Automatic Protection Switching (EAPS) nodes, and an EAPS shared-link, wherein the plurality of EAPS nodes are connected to one or more EAPS rings, and wherein the EAPS shared-link connects the first routing device to the second routing device; and processing circuitry configured to:
  forward traffic on a Virtual Private LAN Service (VPLS) network comprising a first VPLS node and a second VPLS node, wherein the VPLS network includes a plurality of pseudowire links connected to the first routing device,
  detect a network failure of the EAPS shared-link,
  in response to detecting the network failure of the EAPS shared-link, determine that at least one of the plurality of EAPS nodes has a path to both of the first VPLS node and the second VPLS node, and
  in response to determining that at least one of the plurality of EAPS nodes has a path to both of the first VPLS node and the second VPLS node, remove the pseudowire link connecting the first VPLS node to the second VPLS node such that traffic in the network passes through only one of the first VPLS node and the second VPLS node.

13. The first routing device of claim 12, wherein the VPLS network further comprises a third VPLS node linked to at least one of the first VPLS node and the second VPLS node, and wherein the processing circuitry is further configured to:
  communicate an indication of the removed pseudowire link to the third VPLS node.

14. The first routing device of claim 12, wherein the processing circuitry is further configured to:
  reestablish the removed one or more pseudowire links when the first VPLS node detects that the EAPS shared-link is operational.

15. The first routing device of claim 12, wherein the processing circuitry is further configured to:
  determine that the plurality of EAPS nodes lacks a path to one of the first VPLS node and the second VPLS node; and
  in response to detecting the network failure of the EAPS shared-link and determining that the plurality of EAPS nodes lacks the path to one of the first VPLS node and the second VPLS node, maintain the pseudowire link connecting the first VPLS node to the second VPLS node.

16. The first routing device of claim 12, wherein the EAPS shared-link is a pseudowire link.

17. The first routing device of claim 12, further comprising:
  a state machine configured to compute whether each of the plurality of EAPS nodes has access to the first routing device and the second routing device.

18. The first routing device of claim 12, wherein the first routing device and the second routing device are connected to each of a plurality of EAPS rings, and wherein the plurality of EAPS rings utilize the EAPS shared-link.

19. The first routing device of claim 18, wherein the processing circuitry is further configured to:
  determine if at least one of the plurality of EAPS nodes has a path to both of the first VPLS node and the second VPLS node, and
  in response to detecting the network failure of the EAPS shared-link and determining that the at least one of the plurality of EAPS nodes has the path to both of the first VPLS node and the second VPLS node, remove the pseudowire link connecting the first VPLS node to the second VPLS node.

20. The first routing device of claim 12, wherein one of the plurality of EAPS nodes is configured to function as an EAPS master node, and wherein the EAPS master node is configured to receive a control message indicating the network failure of the EAPS shared-link.

21. The first routing device of claim 20, wherein the EAPS master node is further configured to:
  block a secondary port of the EAPS master node; and
  in response to detecting the network failure of the EAPS shared-link, block the secondary port of the EAPS master node.

22. The first routing device of claim 12, wherein the removed pseudowire link transitions from being operational for traffic with the one or more EAPS rings to being non-operational for the traffic with the one or more EAPS rings.

* * * * *